United States Patent [19]

Hauge

[11] 3,919,395

[45] Nov. 11, 1975

[54] PROCESS FOR EXTRACTION OF PHOSPHORUS COMPOUNDS

[75] Inventor: Douglas O. Hauge, Moraga, Calif.

[73] Assignee: United States Gypsum Company, Chicago, Ill.

[22] Filed: Oct. 19, 1971

[21] Appl. No.: 190,511

Related U.S. Application Data

[63] Continuation-in-part of Ser. No. 90,542, Nov. 18, 1970, abandoned.

[52] U.S. Cl. ............ 423/309; 423/311; 423/319; 423/167
[51] Int. Cl. .................... C01b 15/16; C01b 25/26; C01b 25/16
[58] Field of Search .......... 423/166, 167, 317–320, 423/308–309, 311, 313

[56] References Cited

UNITED STATES PATENTS

| 2,013,970 | 9/1935 | Moore | 423/166 |
| 2,114,600 | 4/1938 | Larsson | 423/319 |
| 3,150,957 | 9/1964 | Seymour et al. | 423/319 X |
| 3,359,067 | 12/1967 | Henrickson et al. | 423/166 |
| 3,401,014 | 9/1968 | Saeman | 423/319 |

FOREIGN PATENTS OR APPLICATIONS 938,468  10/1963  United Kingdom

Primary Examiner—Oscar R. Vertiz
Assistant Examiner—Gregory A. Heller
Attorney, Agent, or Firm—Kenneth E. Roberts; Stanton T. Hadley; Samuel Kurlandsky

[57] ABSTRACT

An extraction process for recovery of phosphorus compounds from both low and high grade phosphate ores utilizes a room temperature extraction with dilute mineral acids whose calcium salts are water soluble. Preferably the ore is coarsely ground. Dissolved impurities are removed from the dilute phosphate solution by a first neutralization step, whereafter further neutralization precipitates high purity calcium hydrogen phosphate. The latter may be converted to high purity phosphoric acid by treatment with sulfuric acid. Either lime or ammonia may be used advantageously as a neutralizing agent.

23 Claims, 3 Drawing Figures

PROCESS FOR EXTRACTION OF PHOSPHORUS COMPOUNDS

This application is a continuation-in-part of Ser. No. 90,542, filed Nov. 18, 1970 and now abandoned.

BACKGROUND OF THE INVENTION

Recovery of compounds of phosphorus in usable form from phosphorus-containing minerals is a long established and commercially important industry. The phosphorus containing mineral will be referred to herein as "phosphate rock" or as "phosphate ore." Phosphate rock contains varying amounts of calcium phosphate (apatite) or fluoroapatite. The common impurities present in commercial deposits are silica and silicates, iron and aluminum oxides, limestone and fluorides.

Commercial phosphate operation in this country concentrate on the use of deposits of phosphate rock of relatively high purity, i.e., high calcium phosphate content. These deposits occur principally in Florida, in the lower Appalachian regions and in the northwestern sections of the country. Two general classes of processes are used to recover phosphorus compounds from phosphate rock. In one class of process, the phosphorus content of the rock is reduced to elemental phosphorus in an electric furnace and the recovered phosphorus is burned to phosphorus pentoxide, which is absorbed in water to form phosphoric acid. The other class concerns the so-called wet processes, in which phosphate rock is treated with an acid to release phosphoric acid and precipitates. Most of the wet processes are well summarized in U.S. Pat. No. 3,494,735, a patent which itself discloses yet another wet process. That is, the most common wet-process system is known as the Dorr-Oliver Strong Acid Process involving the following reaction:

1 
Less than furnace grade phosphoric acid results. The Israeli Mining Industries process uses the following reaction:

2. 
Liquid-liquid extraction removes the phosphoric acid. The Dow Chemical process taught in U.S. Pat. No. 3,072,461 proceeds as reaction No. 2 above, but uses fractional distillation to isolate the phosphoric acid. The St. Paul Ammonia Co. process is essentially as follows:

3. 
using a liquid-liquid extraction to isolate the phosphoric acid. Finally, the wet process of the aforesaid U.S. Pat. No. 3,494,735 uses hot (about 100°C) phosphoric acid to leach the phosphate values from the apatite, monocalcium orthophosphate being precipitated by cooling the solution to a temperature between 70°C and 85°C. Impurities are removed by a cationic ion exchange resin. The reactions are as follows:

4. 
5.

It should be noted that all of the above prior art wet-processes are characterized by use of relatively high grade ore and the production of HF gas as a by-product. For example, the aforesaid U.S. Pat. No. 3,494,735, gives as its example a treatment of rock bearing as much $P_2O_5$ as 39.60%. High temperature operation and/or fine grinding of the ore is also a characteristic of these processes.

Other reference to the development of phosphoric acid processes and the present state of the industry can be found in the literature, such as "Phosphoric Acid," by A. V. Slack, volume 1, part 1 (Marcel Dekker, Inc. New York 1968). As is to be expected in an industry of the age and commercial importance of the phosphate industry, such literature on ways to recover useful phosphates from phosphate rock is voluminous and even somewhat confusing. It should be noted, however, that some processes have been developed for treatment of unground, low grade phosphate ore. For example, U.S. Pat. No. 1,969,951 discloses in effect a multiple stage leaching of unground, low-grade ore by the use of dilute HCl absorbed from a by-product gas. Impurities such as $CaF_2$ are precipitated from the pregnant liquor by adding finely phosphate rock. Dical is produced by adding milk of lime.

None of these above-mentioned prior processes recognize that the presence of $R_2O_3$ impurities in the ore requires special leaching steps in order to minimize the amount of these impurities which are dissolved by the acid. Failure to exert such care either results in removal of the dissolved impurities as phosphates, thus lowering the percentage of recovery, or the impurities remain in the calcium phosphate product, whatever its form, thus reducing the grade level at which it can be sold. Also, it should be noted that the best of these prior "wet process" techniques can not recover more than about 75% of the phosphate in a relatively pure form.

As noted above, other acids, such as hydrochloric and nitric, are mentioned in the literature as being of utility in phosphate processing operations. Nevertheless, it appears that only an Israeli process using strong hydrochloric acid has reached commercialization.

OBJECTS OF THE INVENTION

It is the primary object of the invention to attain a process for recovery of useful very pure phosphorus compounds from low purity phosphate rock.

It is a further object of the invention to provide an essentially pollution-free process for recovery of phosphate values from phosphate rock wherein no volatile fluorides are evolved, there are no phosphate slime ponds, and wherein the gypsum co-product is of commercial utility.

It is a further object of this invention to provide a room temperature process for treating low purity phosphate rock.

It is a still further object of the invention to dissolve the phosphate values from the rock with dilute hydrochloric acid in a fashion which minimizes dissolution of impurities.

Another object of the invention is to provide such a process which may be operated either in batch fashion or continuously.

A further object of the invention is to treat the phosphate ore with dilute acid in two stages, in which a dilute acid is used for initial contact with the ore and in which a more concentrated acid thereafter is used for leaching of phosphates from the partially extracted rock.

It is an additional object of the invention to provide a process for very high percentage recovery of relatively pure phosphate values from low grade phosphate ores using dilute mineral acids whose calcium salts are either water or dilute acid soluble.

It is a still further object of the invention to avoid foaming in the leaching operation by using the final leach solution (spent acid solution) containing the dissolved phosphates to moisten the ore as it is fed to the leaching step, thus decomposing the carbonates contained therein.

A further object of the invention is to increase the pH of the acid solution after leaching in two stages, in which the first increase is effected by addition of a calcium phosphate slurry of pH less than 7.

It is a still further object of the invention to adapt the present process to the extraction of phosphate values from so-called highgrade ores, without necessity for prior beneficiation thereof.

Still another object is to separate a highly purified phosphate compound from ore so impure as to be otherwise undesirable, without driving off polluting impurities.

A further object of the invention is to provide a process which will maximize the size of crystals of the end products, thereby increasing the efficiency of recovery of the end-products from the carrier liquid.

Other objects and advantages will become apparent upon reference to the following drawings and detailed discussion.

GENERAL DESCRIPTION OF THE INVENTION

In diametric opposition to the statement on page 19 of the Slack book above referred to, "If rock contains enough impurity to reduce the grade to less than 66 BPL (30.2% $P_2O_5$) it is generally considered to be uneconomical," the process of this invention is designed to operate on phosphate rock containing as little as 5% $P_2O_5$, sometimes even less. The specific combination of process steps involves the use of a very coarsely ground feed, as conventional fine grinds would pose an insuperable filtration problem to remove the relatively high proportion of impurities. Preferred is a grind containing not over about 10% minus 200 mesh material. Preferably, at least about two-thirds should be coarser than 100 mesh. It involves the use of dilute hydrochloric or nitric acid (preferably 2.3–5N) at ambient temperatures. A further requisite is the avoidance of the vigorous agitation of the rock-acid mixture characteristic of some conventional processes. By operating in this fashion, insoluble materials remain in a reasonably readily filterable or separable condition. The phosphate values are recovered from the solution after separating out as by filtering, the impurities in a two-stage specification with lime or ammonia, in each of which close control of pH is a requisite. In the first precipitation, the pH is raised to about 1 to 2, at which point the dissolved impurities largely precipitate and some calcium phosphates are also precipitated. At the higher pH levels, greater efficiency of impurity precipitation is achieved. The second precipitation involves the further addition of lime or ammonia to raise the pH to a level of about 3–5. Under these conditions calcium phosphates in purity adequate to be satisfactory for feed grade products are formed. The final liquid from this process is a solution of calcium chloride (where HCl was the starting acid) of about 10–25% concentration and a pH not exceeding about 6. At this concentration, recovery of hydrochloric acid is readily possible by addition of sulfuric acid to precipitate calcium sulfate, (where lime has been the initial precipitant), the latter coming down under these conditions as a readily filterable material. The hydrochloric acid may then be returned to the process. If desired, the purified calcium phosphates recovered may be treated with sulfuric acid to form high quality phosphoric acid, or other products.

Additionally important in the process is the necessity of maintaining the phosphate concentration in the solutions at a relatively low level, as this facilitates removal of impurities and helps militate against excessive losses of phosphate values with the impurities. Specifically, it is preferable to maintain the concentration of dissolved phosphates in the extraction solutions at not exceeding about 7%, calculated as $P_2O_5$, and preferably in the range of 3–5%.

As indicated hereinabove, the process may be operated either as a batch process or as a continuous process. Each will be illustrated in the specific examples which follow, and it will be appreciated that certain advantages accrue to each, although for commercial purposes the continuous process is preferred. One advantage of the continuous process is that the small amounts of alkali metal compounds present in the low grade rock tend to accumulate in the recirculating leaching acid. This facilitates precipitation of fluoride impurities as calcium fluoride, or sodium and potassium fluosilicate, there being sufficient siliceous material dissolved to permit this reaction. These compounds are quite insoluble, and this reaction thus represents a very satisfactory way to reduce the fluoride impurities. This is a marked advantage over present-day commercial practices, in which volatile fluorides are evolved.

The amount of acid used should be at least stoichiometric. Theoretically, complete conversion of fluorapatite to calcium chloride and phosphoric acid requires 1.71 parts by weight of hydrochloric acid to one part by weight of $P_2O_5$. If, however, the reaction products are monocalcium phosphate $CaH_4(PO_4)_2$, and HF, then the hydrochloric acid requirement is 1.20 weight units per weight unit of $P_2O_5$ contained in the ore. This latter salt has a pH in solution of about 1. Additional acid is required to react with the carbonates and with the other calcium compounds in the ore, such, for example, as calcium hydroxy fluoride. Experience has shown that a usage of hydrochloric acid of about 1.5 or more weight units per weight unit of $P_2O_5$ in the ore is the most advantageous ratio of acid to use. Less total acid is required when the leaching is conducted counter-current in a continuous process.

In a variant of the process, the ore may be treated with dilute acid, as hereinabove described, and a crude separation effected, in which the coarse material insoluble in the acid constitutes one fraction and a slurry of the fines in the acid solution constitutes and the other fraction. The partially leached coarse fraction may thereafter be leached with a stronger acid and washed with water to aid in recovery of dissolved phosphates, and the wash water added to the stronger acid, which is then returned for contact with the starting ore. In a further variant this dilute stronger acid may first be used to treat the fine materials separated from the leach solution for additional dissolution of phosphate values. This is especially advantageous, as, perhaps due to electrostatic effects, the fine materials settle out quite rapidly from a suspension in this acidic solution. They may be removed, washed with water and the wash water added to the diluted stronger acid, and this twice diluted acid may constitute the dilute acid solution brought into contact with the starting ore.

When nitric acid is the dissolving acid, and lime is used in the pH-increasing steps, the nitric acid may be regenerated from the final calcium nitrate solution by precipitation of gypsum by addition of sulfuric acid. If ammonia, on the other hand, is the neutralizing medium, either ammonium nitrate may be recovered or ammonium sulfate may be recovered with conversion to nitric acid of the nitrate moiety for return to the process. Both ammonium sulfate and ammonium nitrate are valuable products in their own right.

Recovery of the phosphate has been remarkably high and of a remarkable purity. At least 80% recovery is standard in the operation of the invention, the phosphate having the purity of "furnace grade" or better, dicalcium, phosphate.

SPECIFIC EMBODIMENTS OF THE INVENTION

EXAMPLE 1

Figure 1:
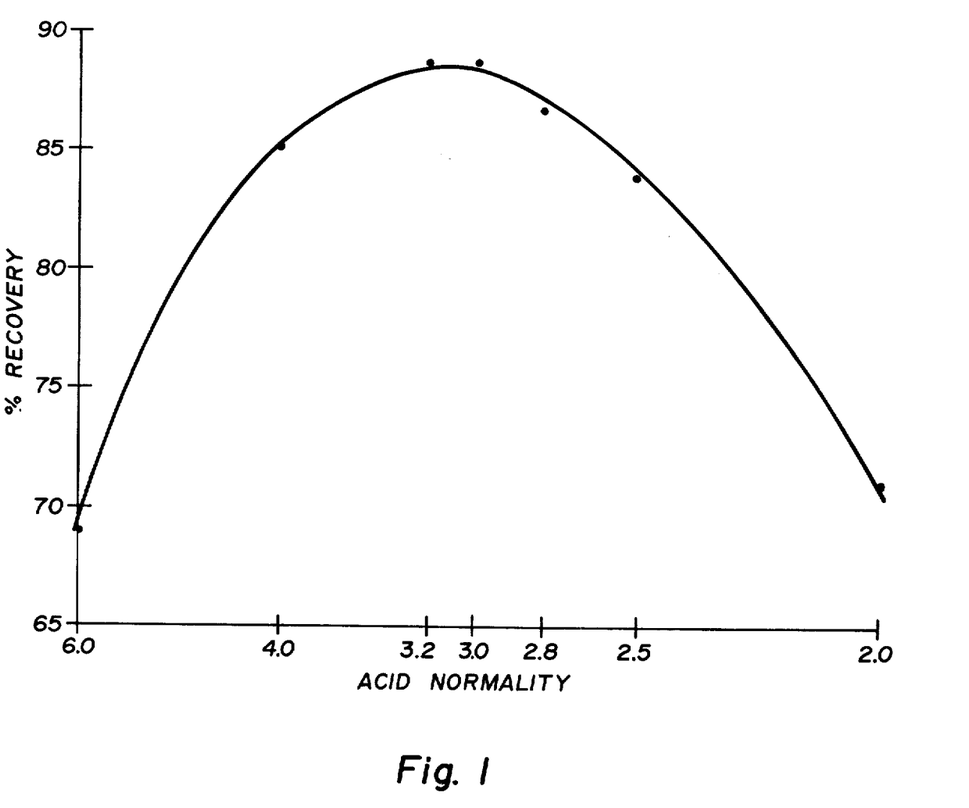
FIG. 1 is a chart depicting the relationship between normality of the acid leach and percent recovery of the phosphate values.

In this Example, the results of which are depicted graphically in FIG. 1, a determination was made of the relationship between normality of acid used to leach the ore and the efficiency of recovery of phosphate values therefrom. The same ore was used in each of the tests. It was a low grade ore containing 8% $P_2O_5$, and was coarsely ground. In each case 50 milliequivalents of acid were used per gram of $P_2O_5$ in the sample. Acid normalities of the HCl used range from 2 to 6. The ore samples were stirred with the volume of acid solution requisite to provide the above-specified total amount of acid and were allowed to stand quiescent at room temperature for 30 minutes. The samples were filtered, washed with water, and the phosphate values recovered were determined by analysis of the filtrate.

As will be seen by inspection of FIG. 1, the results show a somewhat bell-shaped curve, with maximum recovery at an acid normality of about 3. In the 2.3–5N range, recoveries are above 80% under the test conditions, but drop off rapidly as the normality is above or below these limits. This efficiency of recovery exceeds that realized in present commercial processes when yields are computed on the unbeneficiated ore.

Leaching with dilute nitric acid gave similar results.

EXAMPLE 2

Low purity phosphate rock having the analysis:

| | |
|---|---|
| $P_2O_5$ | 8.70% |
| CaO | 14.01% |
| $SiO_2$ | 49.76% |
| $Fe_2O_3$ | 1.14% |
| $Al_2O_3$ | 2.42% |
| F | 0.34% |
| Organics | 4.44% |
| $SO_3$ | 0.81% |
| Cl | 0.07% |
| Carbonate as $CO_2$ | 2.86% |
| $Na_2O$ | 0.27% |
| $K_2O$ | 0.28% |
| MgO | 1.28% |
| L.O.I. | 7.63% | was ground in a swing hammer mill, and oversize material was separated by a Hummer screen and returned to the mill. The ground product had a screen analysis of

| | |
|---|---|
| +14 mesh | 13% |
| −14 mesh | 87% |
| −20 mesh | 73% |
| −28 mesh | 63% |
| −60 mesh | 37% |
| −100 mesh | 26% |

The ground rock was fed, at a rate of 10 lbs/min. to a substantially horizontally mounted drum rotating at about 4 r.p.m. The drum was equipped on its interior walls with a number of vanes to lift the material contained therein and then to let it drop, to provide gentle, non-attritional mechanical agitation. Also fed into the drum along with the ground rock was dilute aqueous hydrochloric acid (3N), at a feed rate of 1.7 gal. per minute. (51.5 M.E./$G.P_2O_5$)

The effect of the gentle agitation in the drum was to retain the coarse particles in the drum in contact with the acid for a somewhat longer time than the residence time of the finer particles. Average residence time was 18 min., and this leaching operation was conducted at ambient temperatures. Recovery of phosphate value was 98% or higher.

The coarse material leaving the leaching drum, together with some of the acid liquor, was deposited directly on a belt filter. The bulk of the liquor, containing some fine material in suspension, was fed to the first of two series arranged settling tanks, the overflow from the first tank discharging into the second. The concentrated slurries of fine material (herein sometimes called "silt") which accumulated at the bottoms of the steeling tanks were pumped to the belt filter and deposited thereon at an intermediate point, at which a filter cake of the coarse material had already accumulated. The supernatant liquor overflowing from the second settling tank had a pH of 0.8. Water was used to wash the cake on the belt filter.

The filter cake, consisting of the coarse material (principally sand) and the silt (also principally sand) was about 23% moisture and amounted to 6 lbs dry solids per minute. (1 lb. per min. superslit left in system.)

To the leached phosphate solution (5% $P_2O_5$) was added (first precipitate) milk of lime at the rate of 1.8 gram $Ca(OH)_2$ per 100 ml. leached solution. This reaised the pH to 2 and caused precipitation of impurities (calcium, aluminum and iron salts and fluorides), which were separated.

The thus purified filtrate was treated with (second precipitate) milk of lime at the rate of 2 grams $Ca(OH)_2$ per 100 ml., which raised the pH to 3.5 and caused precipitation of substantially all of the phosphate values as calcium phosphate (principally calcium hydrogen phosphate, often called dical). The precipitated calcium phosphate was separated by filtration on a belt filter. After drying, it had the following analysis:

24.4% Ca
39.4% $P_2O_5$

Theory for 100% dical (dicalcium phosphate dihydrate $CaHPO_4 \cdot 2H_2O$) is 41.24% $P_2O_5$ and 23.29% Ca. Recovery rate of calcium phosphate was 2 lbs./min.

The filtrate was principally an aqueous solution of $CaCl_2$. The $CaCl_2$ concentration was 4.5% as $Ca^{++}$.

Gypsum of high purity was recovered from the $CaCl_2$ solution by adding an approximately stoichiometric quantity of sulfuric acid. The precipitated gypsum was of food grade. It was recovered by filtration and the filtrate (hydrochloric acid solution 3N) was sent to a storage tank for reuse.

EXAMPLE 3

A variant of the continuous process described in Example 2 is illustrated in this example. In this example, two leach drums were used, the drums being arranged in series. In each case, the drums were substantially horizontally mounted and rotated slowly. As in the preceding example, vanes affixed to the interior walls of the drums lifted the material and dropped it gently back into the bottom periphery of the drum. A little of the final acidic phosphate solution was used to moisten the rock fed to the first drum to avoid lumping, and also to decompose carbonates in the feeder, thus minimizing foaming in the leach drums. A pug mill was used to provide a positive feed of the moistened ground rock. The first leach drum operated on a counter current basis, with the moistened ground rock being fed to one end of the drum and an intermediate acidic phosphate solution (to be later described) was fed to the opposite end of the drum. The counter-current action removed the liquid containing some fine particles suspended therein from the first end of the drum, while from the second end of the drum emerged principally the coarser particles of rock, partially extracted. These coarser particles had an analysis of 4.3% $P_2O_5$, 2.6% $R_2O_3$, and .8% fluorine. This is to be compared with 8.4% $P_2O_5$, 3.0% $R_2O_3$ and 1.0% fluorine in the starting rock. The coarse particles were fed to the second leach drum co-currently with a stronger acid solution, (6 normal HCl). The solids and the liquor were separated as they emerged from the opposite end of the second drum, and the solids were washed with water, and the wash water was added to the fine particles already separated from the pregnant liquor, the wash water having a strength of about 3.4 normal. The suspension emerging from the first end of the first drum was separated by settling, and the fine solids were then suspended in the 3.4 normal liquor from the second drum. They were removed and washed with water and the wash water was added to the liquor. This liquor, which had a normality of 3, is the liquor which is fed counter-current to the second end of the first leach drum. The coarse solids removed from the second leach drum contained .03% $P_2O_5$, 1.5% $R_2O_3$ and 0% fluorine.

It will be seen that the partial removal of phosphate values in the first leach drum permits use of somewhat stronger acid in the second leach drum for more effective penetration of the coarse particles, without producing a solution which is so concentrated that some of the phosphate product would reprecipitate. Further, it has been discovered that the fines are the source of most of the $R_2O_3$ impurities, and the above separation of the fines prevents the stronger acid from acting on it.

The acidic phosphate liquor recovered as indicated above was treated with a pH 6 slurry containing dissolved phosphates, as well as precipitated calcium phosphates. The amount thereof was sufficient to bring the solution pH to 3. Dical precipitated and was recovered by filtration. The supernatant liquor was treated with lime water to pH 6, thus forming the material used for the initial neutralization described above.

This procedure has an advantage over direct addition of lime water to the acidic phosphate solution, in that in the latter the very strongly alkaline character of the lime tends to form precipitates with a core of lime or tricalcium phosphate, surrounded by phosphates of lesser neutralization. A purer precipitate is produced by the precipitation described in this example. In this example, it has also been found advantageous to use the recovered calcium chloride solution or water as suspending agent to produce the lime water slurry used in the liming step.

The hydrochloric acid can be regenerated from the calcium chloride solution, with the co-recovery of gypsum, as described in the preceding example.

EXAMPLE 4

Figure 2:
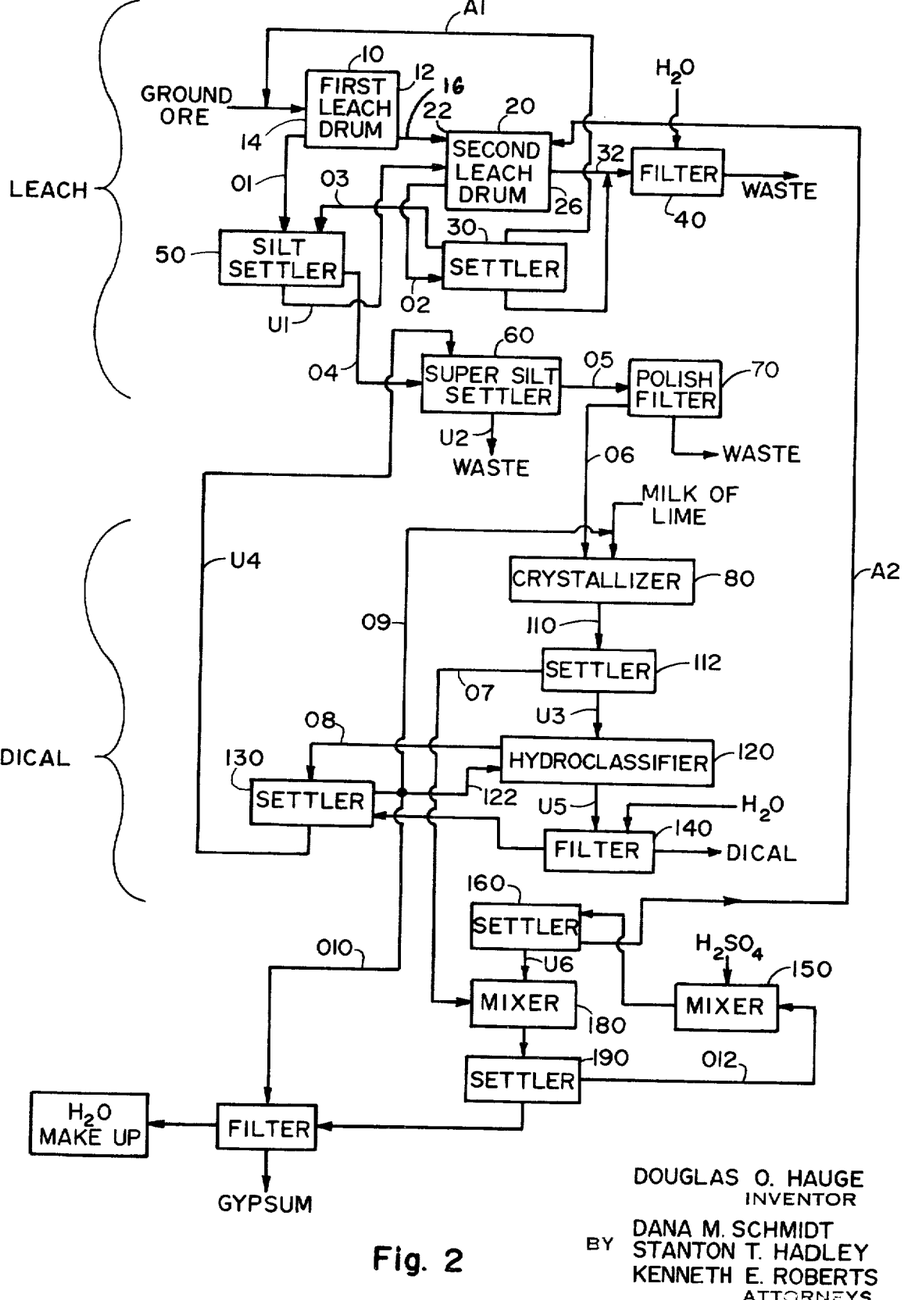
FIG. 2 is a flow chart of the preferred process of the invention.

Still another variant, which is the preferred embodiment of the process, is shown schematically in FIG. 2. This example is similar to the preceding one. Like the previous embodiments, the ore is only coarsely ground and is fed into, in succession, first and second leach drums 10 and 20. Unlike the previous embodiment, the dilute acid of about 0.2 normality indentified as line A1 and having a pH of about 0.5, is not added at the opposite end 12 of drum 10 but rather is added to the ore as it is fed into the drum by a pug mill, not shown. The function of the pug mill is to blend the weak acid with the ore so as to break down the minute gas bubbles which otherwise form under the action of the acid and cling to the ore, preventing the ore from mixing properly in the leach drum. This dilute acid is primarily phosphoric acid, as in the previous embodiments. The drum is slowly rotated (about 4 RPM) and tilted so that the overflow O1 comes out the incoming end 14, carrying with it the silt and supersilt and the easily extractable phosphates. The inclination of the both drums from the horizontal is approximately one-half inch per foot. Most of the $R_2O_3$ impurities are carried out as ultrasilt or included therein. This material is separated in settler 50 and the liquid becomes the underflow U1 from the silt settler 50, hereafter discussed, and fed into the second leach drum 20 at its first end 22. The stronger acid A2 is fed countercurrent at the opposite end 26. This acid is an 8% solution of HCl including about 0.5% by weight gypsum fines, which is recycled from a subsequent treatment hereinafter described. The percent concentration of acid A2 preferably does not exceed about 8% so as to minimize any tendency to dissolve any impurities introduced by underflow U1. Overflow O2 from drum 20 carries with it the remaining phosphate values dissolved therein, along with the gypsum fines and some fine grade sand. Settler 30 removes the sand and combines it with the spent sand 32. All this sand is then separated from liquid by a filter 40, which may either be a belt filter or a rotary filter, and dumped as a waste. The gypsum fines introduced by acid A2 come out in the overflow, which latter is divided into two streams O3 and A1. The splitting of this overflow accomplishes two things. First it prevents flooding of drum 10 which would undesirably reduce the residence time of the fines and ultrafines below the approximate 15 minutes which is desired, and secondly it introduces directly into the silt settler 50 some of the gypsum fines. It has been discovered that these fines (about 50 to 200 microns in size, the larger being acceptable because they disintegrate in the solution) are necessary to maximize the settling of the silt and ultrasilt at settlers 50 and 60, respectively. These fines are about 90% of the input to settler 50. Although the mechanism of this phenomenon is not completely understood, it is thought that it is similar to the known effect which calcium ions have in the precipitation of clay. As mentioned above, the silt in underflow U1 is added to the first extracted sand 16. This silt is in the 100 to 200 mesh size.

Overflow O4 carries with it the dissolved phosphates, the supersilt which includes $R_2O_3$ impurities and $CaF_2$ introduced by O1 and O3, and 0.5% gypsum fines, to the supersilt settler 60. The supersilt extracted here as underflow U2 includes the impurities $CaF_2$ and $R_2O_3$, and silica. The impurities $R_2O_3$ and CaF are to some minor extent also dissolved in O4, and these are precipitated out at settler 60 by the addition, described below, of underflow U4. Extracts U2 can be dumped with the waste from filter 40, or it can be filtered separately for agricultural (fertilizer) uses, or converted into acid.

From settler 60, overflow O5 is essentially free from suspended or entrained solids, with the exception of fine silicas in a colloidal solution. It has been found that this colloidal solution must be removed if large size product crystals are to be recovered. It has been discovered that a polishing filter 70 using gypsum as the filtering medium is very effective in removing this collodial solution. Any length gypsum crystals are suitable for this. Overflow O6 therefrom is characterized by a sparkling clear appearance, and is the pregnant liquor with the desired phosphate values. Its pH at this point is about 1.0.

Turning now to the dical production stage in the process, the pregnant liquor is carried to crystallizer 80, the details of which are set forth below. Saturated milk of lime with a pH of about 10 and an excess of OH radicals is introduced into the crystallizer in a counter-current, finely dispersed mixing action. It is necessary to keep the percent of phosphate above 1% in this reaction, to insure that the precipitate is dicalcium phosphate rather than tricalcium phosphate. To maximize crystal growth and thereby aid in recovering the dical crystals, the temperature of the crystallizer must be maintained between 120°–125°F and gently agitated (about 30 RPM). The dical slurry 110 so produced is taken to a settler 112, where the overflow O7 is the $CaCl_2$ produced by the crystallizer, which is then optionally reacted to produce gypsum. Underflow U3 is still a dical slurry, although more concentrated, and this proceeds to hydroclassifier 120. This classifier conventionally introduces a water back wash 122 from settler 130 to carry off as overflow O8 fines still in the slurry U3. These fines include fine crystals of dical, and are in the size range of between about 10 and 50 microns. These fines are separated by settler 130 and are extracted as underflow U4 which is returned as a fine slurry of dical to settler 60 as described above. Underflow U4 raises the pH in settler 60 to about 1, thus causing any dissolved impurities such as $CaF_2$, $R_2O_3$ and monocal to precipitate. The underflow also raises the $P_2O_5$ content in the pregnant liquor.

Overflow O9 and O10 are each a weak dical slurry of a pH of between about 3.5 and 5. The O9 portion is returned to be combined with the milk of lime and O10 is used as a gypsum wash described below. Underflow U5 is the dical product which is conventionally filtered at 140 and recovered. The water wash which is run through filter 140 is sent to the settler where the liquid component is added to the overflow 122.

It is important to note in this decal processing that, unlike prior art methods, it is not necessary to add lime or a water-soluble base, to settler 112 to cause adequate separation of the dical. This is due to the increased crystallization efficiency provided by the efficient mixing action of the crystallizer 80 described below.

It is further important to note the manner in which this process keeps impurities to a minimum. Specifically, the $R_2O_3$ impurities must be separated from the action of the stronger acid supplied by line A2. This is rendered possible by the separation of the fine portions of the ore in drum 10, and the removal of the fines by overflow O1. As the $R_2O_3$ impurities are by and large supersilt, these are carried out by overflow O4 to settler 60, rather than as underflow U1 which does receive the stronger acid leach in drum 20. Also, any dissolved $R_2O_3$ impurities are contained in overflow O4, and precipitated out at settler 60 due to the increase in pH caused by the addition of underflow U4 thereto. As to the $CaF_2$ impurities, these can be and are leached out in a minor degree and/or carried as silt from either leach drum, but in any event are collected by settler 60 particularly due to the increase in pH causing their precipitation. Thus, the dical which comes from filter 140 has a very high purity.

Turning now to the formation of by-product gypsum, this step is followed primarily to recover the leach acid HCl necessary in leach drum 20, and is primarily a conventional process with the following exceptions. First, the sulfuric acid must be added to mixer 150 in a preferred ratio and at a preferred mixing temperature to achieve optimum crystal growth. Also, maximum growth is achieved by maintaining rapid and intimate mixing. For example, it has been discovered that operation of mixer 150 at 10°C produces crystal sizes of around 10 microns, at 45°C produces sizes between about 50 and 100 microns, and at 65°C produces sizes of between about 100 and 200 microns. Above 65°C, the HCl resulting from the reaction tends to vaporize rather than be recovered. As to the optimum ion ratio, it has been discovered that larger needle-like crystals are produced if Cl ions in excess of the stiochiometric amount are provided. More specifically, if an equal volume of HCl having the same normality as the $CaCl_2$ is added to the latter before adding 96% concentrated $H_2SO_4$, a lower moisture content is provided by the gypsum crystals formed thereby, than would be the case if the "dilution" of the $Ca^{++}$ did not take place. (See the Table below).

| REACTION | | % Moisture |
|---|---|---|
| 9ml 36N $H_2SO_4$ + | 100ml 3N $CaCl_2$+100ml 3N HCl | 39.0 |
| 18ml 18N $H_2SO_4$ + | 91ml 3.3N $CaCl_2$+109ml 3N HCl | 42.5 |
| 18ml 18N $H_2SO_4$ + | 91ml 3.3N $CaCl_2$ | 46.5 |
| 18ml 18N $H_2SO_4$ + | 100ml 3N $CaCl_2$+91ml 3.3N HCl | 50.5 |
| 9ml 36N $H_2SO_4$ + | 100ml 3N $CaCl_2$ | 53.5 |

The moisture content is an inverse measure of the crystal length, as the longer crystals do not pack well thus making a more porous cake which retains less moisture. The water content of about 40% produces a size of crystals which ranges between about 100 and 200 microns in length. Yet additional HCl cannot be added to the $CaCl_2$ as such a step would sacrifice the recycle HCl needed in the strong leaching step. As can be seen from FIG. 2, the mechanism for diluting the $CaCl_2$ comprises drawing off some (about one-half) of the HCl as part of underflow U6. This is added to the $CaCl_2$ in mixer 180, and the gypsum from underflow U6 is separated in settler 190. The overflow O12 comprising the now diluted $CaCl_2$ is carried to the mixer 150 where it is combined with the $H_2SO_4$. The temperature of the mixer 150 can be maintained at 65°C by cooling, if necessary, underflow U6 from settler 160.

The products of the reaction in mixer 150 go to settler 160 where the HCl is removed and introduced at A2 to drum 20. The gypsum crystals are extracted as underflow U6, washed and settled by means of overflow O10 to remove remaining HCl.

In the above steps, make-up water can be used as wash water so as to avoid waste streams.

The temperatures of the above reactions are only slightly above room temperature, thus avoiding the need for highly acid-resistant containers and avoiding vaporization problems. Thus, plastic containers can be used. The controlling temperatures are those of the crystallizer 80 and the mixer 150 which because of the recycling cause the other temperatures to increase slightly above room temperature. Representative temperatures and pH's of the various lines and containers described above are as follows:

| Line | Temperature | pH |
|---|---|---|
| A1 | 20°C–22°C | 0.5 |
| A2 | 20°C–22°C | 0.1 |
| O1 | 20°C–22°C | 0.6 |
| O2 | 20°C–22°C | 0.4 |
| O3 | 20°C–22°C | 0.5 |
| O4 | 20°C–22°C | 0.6 |
| O5 | 20°C–22°C | 1.0 |
| O6 | 20°C–22°C | 1.0 |
| O7 | 25°C–27°C | 4.0 |
| O8 | 22°C | 3.5–5.0 |
| O9 | 20°C | 3.5–5 |
| O10 | 20°C | 3.5–5 |
| O12 | 35°–45°C | 0.1 |
| U1 | 20°C | 0.6 |
| U2 | 20°C | 1.0 |
| U3 | 35°C | 3.5–5.0 |
| U4 | 22°C | 4–4.5 |
| U5 | 25°C | 3.5–5.0 |
| U6 | 40°C | 0.1 |
| 110 | 50°C | 3.5–5.0 |
| Container | | |
| 10 | 20°C | 0.6 |
| 20 | 20°C | 0.4 |
| 30 | 20°C | 0.5 |
| 50 | 20°C | 0.6 |
| 60 | 20°C | about 1 |
| 80 | 50°C | 3.5–5 |
| 112 | 40°C | 3.5–5 |
| 120 | 30°C | 3.5–5 |
| 130 | 25°C | 3.5–5 |
| 150 | around 65°C | 0.1 |
| 160 | 55°C | 0.1 |

It should be emphasized that this preferred example is characterized by a very high level recovery of $P_2O_5$ as measured from the phosphate in the unbeneficiated ore. That is, the process as outlined in FIG. 2 permits essentially no phosphate values to be lost. Actual experimental recovery of the $P_2O_5$ in the form of dicalcium phosphate has been on the order of 90% or higher. A further characteristic of this highly recovered dicalcium phosphate is its purity. That is, conventional processes can be used to convert this dical to feed grade phosphoric acid, or furnace grade acid. "Feed grade" phosphoric acid is characterized by the AAFCO as having, per each percentage of phosphorus present, no more than 100ppm fluorine, no more than 3.2 ppm arsenic, and no more than 1.3 ppm of heavy metals reported as lead. Thus, a 75% $H_3PO_4$ solution which can be made from the dical produced as above will have no more than 0.24% by weight fluorine.

Figure 3:
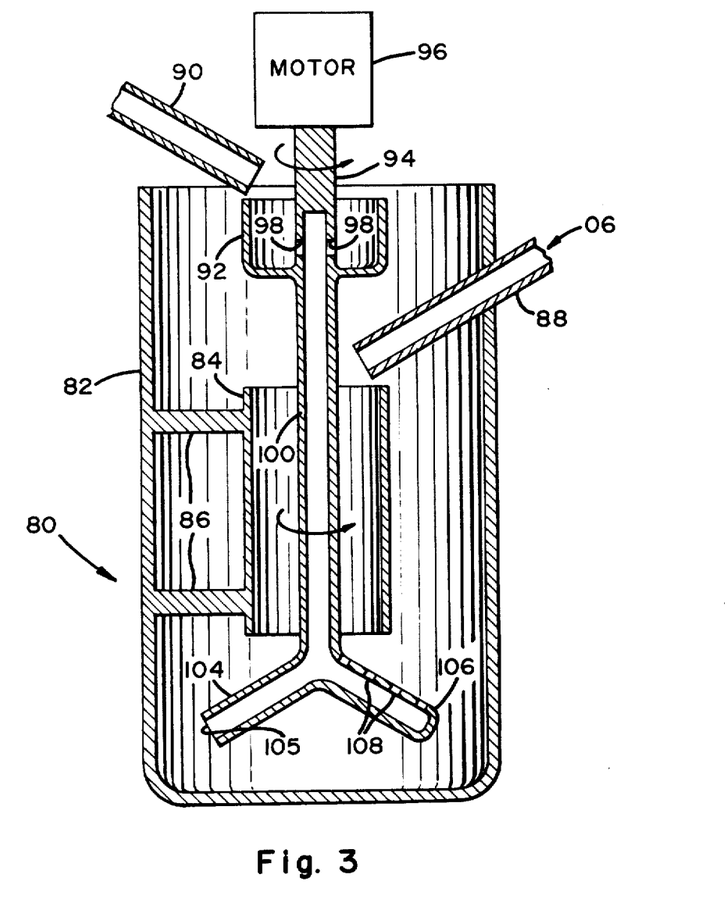
FIG. 3 is a sectional view of the crystallizer used in the process shown in FIG. 2.

Turning now to the apparatus utilized in the above-described process, FIG. 3 illustrates the details of a representative crystallizer 80. A tank 82 is provided with a draft tube 84 mounted concentrically with the axis of the tank, from the inside of the tank as by arms 86 welded thereto. The pregnant liquor O6 containing the acids is added to tank 82 via the draft tube, being supplied thereto by a pipe 88. The milk of lime is supplied centrally of tank 82 via a pipe 90 which feeds into a cup 92 mounted on a rotating shaft 94 driven by motor 96. Near the base of the shaft, holes 98 are provided and the shaft is joined below cup 92 to a hollow pipe 100 concentrically mounted within the tube 84. Alternatively, pipe 100 and shaft 94 can be an integral piece. At the bottom end of pipe 100, two branches 104 and 106 are provided. Each branch is illustrated as being different, but only for purposes of depicting alternate arrangements. Thus, branch 104 is provided with an opening only at the end 105 thereof, while branch 106 is provided with openings 108 spaced along the upper surface thereof. The angle at which the branches extend from pipe 100 is not critical. The effect of either arrangement is to force the milk of lime to rise upwardly through a descending column of pregnant liquor. Rotation of the branches additionally causes further mixing of the two reactants.

Other apparatus provided in the above Example 4 can be conventional, and accordingly is not described herein.

EXAMPLE 5

This example illustrates the applicability of the invention to high quality phosphate ores. Samples of high quality ores both as mined and after beneficiation were tested in this experiment. The samples wee leached for 30 minutes at ambient temperatures using 55 milliequivalents of 3N HCl per gram of $P_2O_5$ in the ore (this amounts to two parts by weight of hydrogen chloride per part by weight of $P_2O_5$). The results of these tests were as follows, $Fe_2O_3$ being reported as indicative of impurity level:

| Sample | Screen Size | Rock Anal. $P_2O_5$ | $Fe_2O_3$ | Leach Soln %$P_2O_5$ | %$Fe_2O_3$ | % Recovery of $P_2O_5$ |
|---|---|---|---|---|---|---|
| Unbeneficiated Ore | –28 mesh | 15.1% | 1.1% | 4.5% | — | 82.5% |
| Unbeneficiated Ore | –100 mesh | 15.1% | 1.1% | 5.3% | .21% | 97.1% |
| Beneficiated Ore | –28 mesh | 36.5% | .64% | 5.6% | .07% | 99.4% |

It is well known that the beneficiation step in most conventional wet acid phosphate processes results in the discard of more phosphate values than are contained in the low purity rock to which this invention is primarily directed. It will thus be seen that the process of the present invention permits substantially more effective recovery of phosphate values in the total rock than is accomplished by most present commercial processes.

EXAMPLE 6

In this example, a laboratory scale batch type operation was used as a simulation of a continuous process in order to secure accurate material balances. The results reported herein represent the fourth batch cycle, in order that recirculation of the various recirculated materials could bring the process to reasonable equilibrium. Analytical results on starting materials and various products are summarized in the subjoined table. Starting rock was ground to the following screen analysis:

|         |       |
|---------|-------|
| −⅛"     | 100%  |
| − 8 mesh| 77%   |
| − 16 mesh| 55%  |
| − 28 mesh| 41%  |
| − 50 mesh| 28%  |
| −100 mesh| 15%  |
| −200 mesh| 7%   |

It will be observed that this screen analysis shows a grind in very sharp contradistinction to the grinds typically used in commercial wet phosphate operations, wherein the grind is typically 90% through a 200 mesh screen.

A two stage leach was used in which in the first stage 200 grams of fresh rock were leached for 3 minutes with dilute acid from a subsequent step. This served principally to react the carbonates and the very reactive phosphates with the diluted hydrochloric-phosphoric acid mixture. The amount of leach liquor used in this operation was 442.3 grams. The leach liquor has a pH of 0.43, and the reaction was conducted at ambient temperature. The liquor from this first leach step (387.7 grams) had a pH of 0.80 and was retained for subsequent recovery of phosphates. The wet cake was then reacted with 340 grams of 10% hydrochloric acid for 10 minutes at room temperature. The unreacted material was separated by filtration and washed with 100 grams of water. The filter cake contained 0.36 grams of water per gram of dry cake. Dry basis cake weight was 170.1 grams. The cake, mostly silica, was discarded. The liquor from the filtration was the material used to react with the fresh rock in repeating the above-described sequence.

The separated leach liquor (387.7 grams at pH 0.8) was heated to 45°C and reacted for 12 minutes with recycled precipitated impurities (later described). The final pH of the liquor was 0.95. The solids (impurities) were separated by filtration and washed wtih 20 grams water. The wet filter cake contained 2.07 grams water per gram dry cake and dry cake weight was 8.43 grams. This cake contained most of the iron, aluminum and fluoride impurities leached from the rock. Liquor, 425.5 grams, pH 0.95, was reacted with 34.1 grams of milk of lime containing 5.11 grams CaO. The reaction was conducted at 45°C for 44 minutes with vigorous agitation. The final pH was 2.40. 26.75 grams of dry solids containing iron, aluminum and fluoroide impurities were separated by filtration and were recycled for reaction with the liquor as described above, followed by final removal from the system. The liquor from this filtration (391.3 grams) was substantially free of iron, aluminum and fluoride impurities.

This liquor was then reacted with 25 grams of milk of lime containing 3.74 grams CaO. This brought the pH to 2.87.

|         | ORE    | INSOLUBLES | LEACH LIQUOR | CALCIUM PHOSPHATE | GYPSUM | REGENERATED HCl |
|---------|--------|------------|--------------|-------------------|--------|-----------------|
| $P_2O_5$ | 6.16%  | .90%       | 3.43%        | 43.04%            | 0.04%  | 4.5 g./L.       |
| CaO     | 14.8%  | 7.5%       | 5.41%        | 34.05%            | 30.94% | 13.5            |
| $Fe_2O_3$| 2.54% | 3.2%       | 0.29%        | 0.40%             |        |                 |
| $Al_2O_3$| 11.44%| 10.92%     | 0.11%        | 0.10%             |        |                 |
| F       | 0.57%  | 0.147%     | 0.25%        | 0.20%             |        |                 |
| $SiO_2$ | 51.95% | 59.02%     |              | 0.40%             |        |                 |
| Cl      | 0.02%  | 0.64%      | 8.53%        | 0.05%             | 177 ppm|                 |
| Na      | 1.56%  | 0.08%      |              |                   | ($Na_2O$) | 7.5          |
| K       | 1.46%  | 0.17%      |              |                   |        |                 |
| $SO_3$  | 1.30%  | 5.12%      |              |                   |        |                 |
| MgO     | .70%   | .97%       |              |                   |        |                 |
| L.O.I.  | 7.7%   | —          |              |                   |        |                 |
| Sp.gr.  |        |            | 1.12         |                   |        |                 |
| pH at 25°C |     |            | 0.80         |                   |        |                 |

The reaction was carried out at 45°C for 99 minutes with vigorous agitation. A mixture of anhydrous dicalcium phosphate and dicalcium phosphate dihydrate was precipitated. The precipitate was separated by filtration and washed with 50 grams of water per gram of dry cake. The dried calcium phosphate weighed 22.17 grams and contained 43.04% $P_2O_5$. Fluorine content was only 0.20%. This product is suitable for animal feed supplements. This represents a final recovery as calcium phosphate of 72% of the available $P_2O_5$ in the as-mined rock. The liquor from this step, containing mainly calcium chloride was evaporated to 297.1 grams and reacted with 36.97 grams of 97% sulfuric acid. The gypsum and hydrochloric acid formed were separated by filtration. The gypsum was washed with 100 grams of water. The wet cake contained 1.07 grams water per gram of dry cake. 50.5 grams of dry gypsum were recovered, suitable for fertilizer or construction products use. The hydrochloric acid was returned to the starting process.

EXAMPLE 7

In another batch process, the ore used in Example 6 was treated with 3 normal nitric acid, using the same quantities of acid on a molar basis. Neutralization was effected in two steps using ammonia as the neutralizing agent. In the first step, impurities were separated from the soluble phosphate product. Use of nitric acid appears to have certain advantages in that ferric phosphate is essentially insoluble in a dilute nitric acid solution, less soluble than it is in a hydrochloric acid solution. The second neutralization step separated dical of good quality (49.8% P$_2$O$_5$, 0.44% fluorine). Recovery of nitrate was effected by treating the filtrate from the dical recovery with ammonium carbonate, which results in removal of residual calcium as calcium carbonate and the formation of ammonium nitrate. This is a valuable by-product as such and may be recovered by evaporation.

In this example the total of acid insolubles, the recovery of phosphate values, and the level of impurities was quite comparable to the results shown in Example 6 where hydrochloric acid was used.

What is claimed is:

1. The process of treating apatite-containing ores which comprises:
    introducing coarsely ground ore into the first end of a slowly rotating substantially horizontally mounted drum,
    introducing introducing into the second end of said drum a 2.3–3 normal aqueous solution of a mineral acid whose calcium salt is water soluble,
    moving said ore and said solution each toward the respective opposite end of said drum,
    removing from said first end spent acid containing dissolved phosphates and fine particle-size solids,
    separating the former from the latter,
    removing from said second end moist coarse particles,
    feeding said coarse particles into the first end of a second slowly rotating substantially horizontally mounted drum, together with a new supply of said acid, said supply having a normality between about 3 and about 7.5,
    moving said coarse particles and said supply through said drum to its second end,
    removing said supply and said coarse particles and separating the one from the other,
    washing said coarse particles with water,
    adding the wash water from said washing step to the separated fine particles removed from said first end of said first drum,
    separating the fine particles from said wash water,
    washing said fine particles with water,
    and adding said fine particles wash water to the coarse particle wash water, the thus further diluted solution constituting the said 2.3–3 normal aqueous mineral acid supplied to said second end of said first drum.

2. The process of claim 1 wherein the said acid is hydrochloric.

3. The process of claim 1 wherein the said acid is nitric.

4. The process of claim 1 wherein the ore fed to said first drum is substantially all minus 20 mesh and at least about two-thirds thereof is plus 100 mesh.

5. The process of claim 1 wherein the ore fed to said first drum is ground to a fineness such that substantially all thereof is minus one-eighth inch and not over about 10% thereof is minus 200 mesh.

6. The process of claim 1 wherein the said fine particles are separated from the suspending liquid by settling.

7. The process of claim 1 wherein the ore is fed to said first drum by a positive mechanical feeder and is moistened in said feeder with the spent acid solution.

8. The process of claim 1, including:
    of further treating the dilute spent acid solution containing dissolved phosphates by the steps of adding thereto a dilute aqueous suspension of pH about 6 of which the solids are principally calcium phosphates, in an amount sufficient to bring the pH of said acidic solution to about 3 to precipitate calcium phosphate;
    separating the precipitate which forms;
    washing and drying the same to produce feed grade calcium phosphate;
    treating the liquor from said precipitate with lime in an amount sufficient to bring the pH thereof to about 6;
    and adding the thus formed suspension to a fresh quantity of said dilute spent acid solution.

9. A process of treating apatite-containing ore which comprises:
    introducing at ambient temperature coarsely ground ore and an about 2–3 normal aqueous solution of a mineral acid whose calcium salt is water soluble into a first end of a slowly rotating drum slightly inclined from the horizontal,
    removing from the second end of the drum coarse particles comprising the ore less the minerals dissolved by the acid in said drum and fine particles,
    removing from the first end of the drum spent acid containing dissolved phosphates, silicate colloidal solutions, and fine particle-size solids,
    separating the spent acid and the dissolved phosphates from the particles and colloidal solution,
    feeding the coarse particles and the separated fine particles into the first end of a second slowly rotating drum slightly inclined from the horizontal,
    feeding into the second end of said second drum a supply of said acid of about 3–7.5 normality,
    moving said stronger acid and the coarser particles counter-current through said second drum,
    removing the spent stronger acid from the first end of the second drum along with dissolved phosphates and an amount of fine particles,
    removing the last-named fine particles from the spent stronger acid,
    and combining the spent stronger acid and dissolved phosphates with the spent dilute acid prior to the removal from the latter of the colloidal solution.

10. The process as defined in claim 9, and further including the steps of increasing the pH of the dissolved phosphates after the colloidal solution has been removed therefrom until dicalcium phosphate has precipitated, said increase being accomplished by the addition of a base selected from the group consisting of lime and ammonia in a manner so as to force the latter to flow counter-current to the flow of dissolved phosphates, the mixture of the two being gently agitated during said addition step.

11. The process as defined in claim 9, and further including the steps of increasing the pH of the dissolved phosphates until dicalcium phosphate has precipitated.

12. The process as defined in claim 11, and further including the steps of:
    forcing water couter-current through the dicalcium phosphate precipitate so as to remove small sized dicalcium crystals therefrom,
    separating the small sized dicalcium crystal from the water,
    and adding the crystals to the spent stronger acid prior to the removal of the fine particles therefrom so as to raise the pH of the stronger acid until impurities are precipitated out of solution.

13. The process as defined in claim 12, wherein the pH of the stronger acid is raised by said fine dicalcium phosphate to about 1.

14. The process as defined in claim 11, and further including the steps of separating the dicalcium phosphate precipitate from the liquor, mixing into the liquor an equal solution of said mineral acid having the same normality as said liquor, and adding to said mixture concentrated $H_2SO_4$ in a manner so as to rapidly and intimately mix said $H_2SO_4$ and said mixture together, whereby gypsum and an additional amount of said mineral acid is produced.

15. The process as defined in claim 14, and further including the steps of recycling approximately one-half of said produced mineral acid to said second drum, and adding the remainder thereto to said liquor.

16. The process as defined in claim 10, and further including the steps of separating said dicalcium phosphate from the liquor, adding to said liquor the acid form of said liquor, and mixing into the thus diluted liquor a solution of $H_2SO_4$, said steps of addition and mixing being characterized by an amount, a rate, and at a temperature sufficient to produce needle-like gypsum crystals having a crystal size of between about 100 and 200 microns.

17. The process as defined in claim 9 further including the step of passing the colloidal solution and the combined spent acids through a gypsum filtering medium to separate colloidal material from the combined spent acids.

18. The process as defined in claim 12, wherein said step of precipitation of impurities includes the step of adding gypsum fines to the stronger acid in the amount of about .5% by weight of the acid.

19. A process for the recovery of phosphate values from phosphate ores which comprises the steps of:
a. treating a coarsely ground phosphate feed material in two separate stages with an about stoichiometric amount of a dilute mineral acid whose calcium salt is water soluble, at ambient temperatures, for a time sufficient to extract phosphate, but maintaining the phosphate concentration at a level not exceeding about 7% $P_2O_5$; the acid being added in two separate stages of differing strengths within the range of about 2–7.5 normality, the weaker being added first, and said treatment being with substantially non-attritional agitation;
b. treating the leach liquor, containing phosphoric acid, in a first precipitation step by raising the pH to about 1 to 2; and separating the precipitated impurities;
c. treating the liquor in a second precipitation step by raising the pH to a level of about 3 to 5; and separating the high purity calcium phosphate precipitate.

20. The process of claim 19 wherein, in step (a), the mineral acid has normalities in the range of about 2.3–5.

21. The process of claim 19 wherein, in step (a), the phosphate concentration is maintained in the range of about 3–5% $P_2O_5$.

22. The process of claim 19 wherein said coarsely ground phosphate feed material is first moistened with a portion of the leach liquor.

23. The process of claim 19 in which the phosphate feed material is treated with dilute mineral acid whose calcium salt is water soluble in two slowly rotating substantially horizontally mounted drums.

* * * * *